(12) United States Patent
Chinn et al.

(10) Patent No.: US 10,902,101 B2
(45) Date of Patent: Jan. 26, 2021

(54) TECHNIQUES FOR DISPLAYING SECURE CONTENT FOR AN APPLICATION THROUGH USER INTERFACE CONTEXT FILE SWITCHING

(71) Applicant: Apple Inc., Cupertino, CA (US)

(72) Inventors: Paul W. Chinn, San Jose, CA (US); Jin Bing Lin, Mountain View, CA (US); Stephen F. Holt, San Francisco, CA (US); David A. Schaefgen, San Jose, CA (US); Nils M. Hayat, San Francisco, CA (US); Jeffrey Y. Hayashida, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 15/980,698

(22) Filed: May 15, 2018

(65) Prior Publication Data
US 2018/0336325 A1    Nov. 22, 2018

Related U.S. Application Data

(60) Provisional application No. 62/507,186, filed on May 16, 2017.

(51) Int. Cl.
*G06F 21/31* (2013.01)
*G06F 21/84* (2013.01)
*G06T 1/20* (2006.01)

(52) U.S. Cl.
CPC .............. *G06F 21/31* (2013.01); *G06F 21/84* (2013.01); *G06T 1/20* (2013.01)

(58) Field of Classification Search
CPC ............ G06F 21/31; G06F 21/84; G06T 1/20
See application file for complete search history.

(56) References Cited

U.S. PATENT DOCUMENTS

| 2006/0070011 | A1* | 3/2006 | Matsuhara | G06F 21/84 715/816 |
| 2007/0271608 | A1* | 11/2007 | Shimizu | G06F 21/6263 726/17 |
| 2011/0055754 | A1* | 3/2011 | Nicholas, III | G06F 3/04812 715/810 |
| 2012/0304280 | A1* | 11/2012 | Hayashida | G06F 21/6218 726/16 |
| 2013/0014248 | A1* | 1/2013 | McLaughlin | G06F 3/04883 726/17 |
| 2013/0027316 | A1 | 1/2013 | Akella | |
| 2013/0167227 | A1* | 6/2013 | Miura | B66C 17/18 726/19 |

(Continued)

*Primary Examiner* — Yonas A Bayou
(74) *Attorney, Agent, or Firm* — Dickinson Wright RLLP

(57) ABSTRACT

Disclosed herein is a technique that can selectively display secure content on a computing device. The technique can detect both lock and unlock events and issue appropriate control signals that cause an application to display a more secure version of the application when necessary based on a particular UI context file. The UI context file can specify a configuration that includes pre-configured hidden or removed UI elements that do not need to be adjusted at runtime. Moreover, the technique can seamlessly pivot to a different UI context file that specifies a configuration of the application that allows the user to experience the full-capabilities of the application when the computing device is in an unlocked-mode.

20 Claims, 10 Drawing Sheets

(56) References Cited

U.S. PATENT DOCUMENTS

| | | | |
|---|---|---|---|
| 2014/0215388 A1* | 7/2014 | Park-Ekecs | G06F 3/04845 |
| | | | 715/800 |
| 2014/0344918 A1* | 11/2014 | Choi | G06F 21/31 |
| | | | 726/16 |
| 2015/0160788 A1* | 6/2015 | Sun | G06Q 10/10 |
| | | | 715/746 |
| 2015/0339468 A1* | 11/2015 | Son | G06F 3/017 |
| | | | 726/19 |
| 2015/0356288 A1* | 12/2015 | Guo | G06F 21/36 |
| | | | 726/18 |
| 2015/0371016 A1 | 12/2015 | Nielsen et al. | |
| 2016/0026347 A1* | 1/2016 | Gehring | G06F 21/31 |
| | | | 715/810 |
| 2016/0111404 A1* | 4/2016 | Sanders | H01L 23/481 |
| | | | 257/531 |

\* cited by examiner

TECHNIQUES FOR DISPLAYING SECURE CONTENT FOR AN APPLICATION THROUGH USER INTERFACE CONTEXT FILE SWITCHING

CROSS-REFERENCE TO RELATED APPLICATIONS

The present application claims the benefit of U.S. Provisional Application No. 62/507,186, entitled "TECHNIQUES FOR DISPLAYING SECURE CONTENT FOR AN APPLICATION THROUGH USER INTERFACE CONTEXT FILE SWITCHING," filed May 16, 2017, the content of which is incorporated herein by reference in its entirety for all purposes.

The present application is related to U.S. patent application Ser. No. 15/715,005, entitled "DEVICES, METHODS, AND GRAPHICAL USER INTERFACES FOR ACCESSING NOTIFICATIONS," filed Sep. 25, 2017, which claims benefit of U.S. Provisional Patent Application No. 62/507,181, entitled "DEVICES, METHODS, AND GRAPHICAL USER INTERFACES FOR ACCESSING NOTIFICATIONS," filed May 16, 2017.

FIELD

The described embodiments set forth a technique for displaying content on a computing device. More particularly, the present embodiments relate to techniques that involve displaying content of an application in a more secure manner.

BACKGROUND

Recent years have shown a proliferation in the number of individuals who own and operate computing devices (e.g., smartphones and tablets). Typically, an individual uses his or her computing device to carry out different types of activities throughout the day, e.g., placing phone calls, sending and receiving electronic messages, accessing the internet, and the like. Consequently, the level of security of computing devices is being scrutinized due to the sensitivity of the data that is commonly stored on computing devices. This data can include, for example, address book information, email information, photographs, and the like.

One approach that attempts to provide a form of security involves a lock screen that can be manually or automatically engaged. Specifically, when a lock screen is engaged, the lock screen can permit limited functionality—such as placing emergency phone calls, or answering an incoming phone call—but prevent all other functionality from taking place. Unfortunately, malicious individuals continue to identify different techniques to circumvent the lock screen, which places the security of the average user at risk when his or her computing device is apprehended and private user information can potentially be accessed.

SUMMARY

Accordingly, representative embodiments set forth herein disclose techniques that can selectively display content in a more secure fashion when necessary and in a less cumbersome manner.

One embodiment sets forth a method for displaying content on a computing device. In particular, the method involves, at the computing device, (1) executing an application, (2) detecting a lock event on the computing device, (3) responsive to the lock event, selecting a first context file from a plurality of context files associated with the application to render a secure content of the application for display on the computing device, (4) detecting an unlock event on the computing device, and (5) responsive to the unlock event, pivoting to a second context file from the plurality of context files to render a typical content of the application for display on the computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
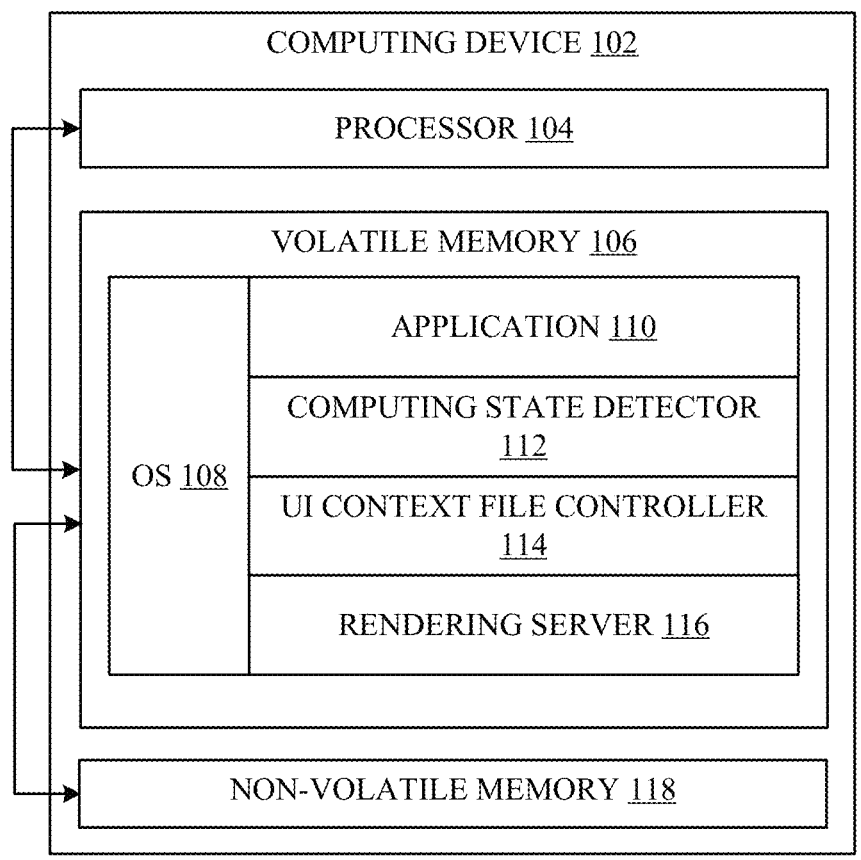
FIG. 1 illustrates a block diagram of different components of a system that is configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Conventional approaches for displaying content of an application in a secure manner on a computing device tend to create at least some form of vulnerability on the computing device. For example, conventional approaches typically require application developers to take on the insurmountable task of identifying and designing around every path in which a potential security breach can occur. Consequently, malicious individuals can seek out and exploit the unidentified paths and create headaches for application developers and users alike.

To cure the foregoing deficiencies, the embodiments set forth herein provide a technique that enables an application to selectively activate a more secure version of the application when the computing device is in a locked-mode. The secure version of the application can be configured to hide private user information for the duration of the locked-mode period. Additionally, the embodiments set forth herein provide a technique that allows the application to seamlessly pivot, using different UI context files, between a typical display of content associated with the application to the more secure version of the application based on the computing state of the computing device.

According to some embodiments, a computing device can detect a lock event and issue control signals that cause an application to generate graphics-rendering instructions to display a version of the application that limits the visibility of private user information based on the use of a specific UI context file managed by the application. In particular, the UI context file can specify a configuration of the application that includes pre-configured hidden or removed UI elements that do not need to be adjusted at runtime.

Additionally, the computing device can also detect an unlock event and issue control signals that cause the application to dynamically pivot to a different UI context file. The UI context file used during the unlock event can allow the application to display any information considered relevant to the application. By pivoting between UI context files using the techniques described herein, the user can enjoy the rich capabilities of an application in a manner that reduces the likelihood of private user information being exposed when the computing device is in a locked-mode. Furthermore, developers of an application no longer need to be concerned with how to actively add/remove UI elements from the application when transitioning between secure/unsecure modes, as required by the conventional techniques. Instead, the developers can focus on designing a secure version of the application in a holistic manner that can enhance the overall security and user experience provided by the application.

A more detailed description of the various techniques described herein, and the manner in which they can be implemented, is provided below in conjunction with FIGS. 1, 2, 3A-3B, 4A-4C, 5, 6, and 7.

Figure 7:
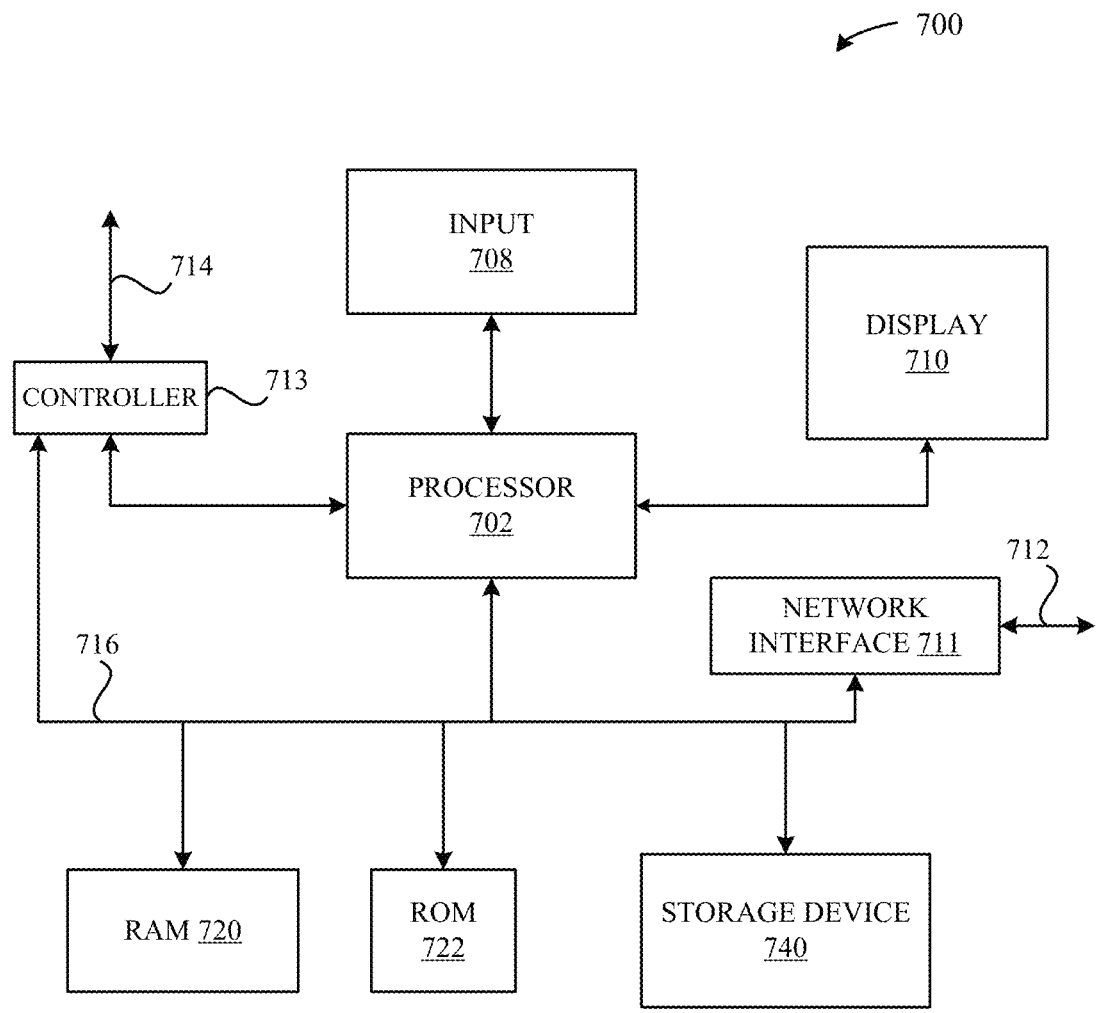
FIG. 7 illustrates a detailed view of a computing device that can be used to implement the various components described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 118 (e.g., a storage device). It is noted that a more detailed breakdown of example hardware components that can be included in the computing device 102 is illustrated in FIG. 7, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) 108 can be loaded into the volatile memory 106, where the OS 108 can execute a variety of applications that collectively enable the various techniques described herein to be implemented. As described in greater detail herein, such applications can include an application 110, a computing state detector 112, a UI context file controller 114, and a rendering server 116.

According to some embodiments, the computing state detector 112 can include the functionality to continuously monitor a computing state of the computing device 102 and correspondingly alert other components resident on the computing device 102 of changes that occur to the computing state of the computing device 102. In this fashion, the computing state detector 112 can identify behaviors that are consistent with different system-level events that can cause a change in computing state on the computing device 102. Examples of computing state behaviors detected by the computing state detector 112 can include, but are not limited to, computing state behaviors associated with locked and unlocked modes, awake and sleep computing states, system services being activated or deactivated, various application execution states, and so on. Control signals sent by the computing state detector 112 in response to detected computing state changes can be used by other components, such as the UI context file controller 114, which can perform additional procedures upon detection of a computing state change.

According to some embodiments, the UI context file controller 114 can be configured to send control signals that instruct the application 110 to switch from a UI context file currently being used by the application 110 to a different UI context file. For example, the computing state detector 112 can issue control signals to the UI context file controller 114 (e.g., in response to a locked-mode being activated), whereupon the UI context file controller 114 can send control signals that cause the application 110 to pivot to a different UI context file (e.g., a more secure context UI file that limits the visibility of UI elements displaying sensitive information/omits sensitive information).

According to some embodiments, a UI context file used by the application 110 can be pre-configured and include several pre-defined UI elements that are arranged in a specific order that is particular to the UI context file. In particular, the UI context file can include information that is compatible with a rendering server, e.g., pre-defined UI objects that can be properly rendered into a primary UI by a rendering server. In turn, the primary UI can be output to a display device communicably coupled to the computing device 102.

Accordingly, the application 110 can be enabled by the UI context file controller 114 to selectively use different UI context files that can allow the application 110 to provide an enjoyable and more secure user experience. The procedures performed by the UI context file controller 114 enable the application 110 to utilize a virtualized shared data model. The virtualized shared data model allows the application 110 to, under certain prescribed conditions—examples of which are set forth in greater detail in descriptions of FIGS. 2, 3A-3B, 4A-4C, 5, 6, and 7—appear as different applications that have equal access to the same data.

For instance, it is well-understood that the computing device 102 can periodically engage in a locked-mode and an unlocked-mode. During the locked-mode, the computing device 102 can limit a level of user access to data stored on the computing device 102 until the computing device 102 recognizes that proper credentials have been received. Once proper credentials have been received, the computing device 102 can activate the unlocked-mode, at which point the computing device 102 allows a greater level of user access to data stored on the computing device 102.

Thus, when the computing device 102 operates within the locked-mode, it can be desirable to enable a "secure" version of the application 110 that produces "secure" content configured to limit the ability of the application 110 to display private user information. Although private user information can be hidden when the application 110 displays the secure content, the secure content can be configured to allow the user to enjoy aspects of the application 110 where security issues are of no concern. Additionally, when the computing device 102 operates within the unlocked-mode, it can be desirable to enable a "typical" version of the application 110 that produces "typical" content configured to maximize a user's ability to make full use of features provided by the application 110. Therefore, the application 110 can be enabled to seamlessly transition between secure content and typical content, so as to not minimize the user's enjoyment with the application 110, by pivoting between different pre-configured UI context files when the computing device 102 toggles between the locked-mode and the unlocked-mode.

It is noted that determinations regarding the specific GUI objects of different UI contexts can be made during development of the application 110 in accordance with the user experiences that are desired. For instance, in some embodiments, the application 110 can be a real-time navigation application (e.g., Apple Maps®) executed on the computing device 102 for providing navigational directions to a user. During the development of the application 110, an application developer can determine that a desirable user experience includes providing the secure version of the application 110 in which a user's private information is not revealed while navigational directions are displayed on the computing device 102 when the computing device 102 is in the locked-mode.

According to some embodiments, the rendering server 116 includes the functionality to render graphical content by processing graphics-rendering instructions issued by different applications, including the application 110, to produce content for display on a display device coupled to the computing device 102. For example, the rendering server 116 can receive graphics-rendering instructions associated with a given UI context file and produce window data that includes, for example, pixel display coordinates, pixel height, width, and/or geometry data, color values, and the like. Additionally, the rendering server 116 can process parameter data related to the computing device 102 that includes, for example, properties of a display device, properties of the computing device 102, a current orientation of the computing device 102, and so on. It should also be noted that any reference to "window" or "windows" herein is not meant to be limiting and can include any type of image, such as digital images (e.g., JPEG images, graphics interchange format (GIF) images, etc.). Reference to "window" or "windows" can also include, but is not limited to, image frames capable of being processed by a graphics processor, two-dimensional (2D) images, three-dimensional (3D) images, and the like.

Rendering server 116 can also include compositing functionality that allows the rendering server 116 receive different sets of graphics-rendering instructions from the application 110 to produce different types of content. For example, the rendering server 116 can process one particular set of graphics-rendering instructions from the application 110 to produce one form of content (e.g., typical content), and can process a different set of graphics-rendering instructions from the application 110 to produce a different form of content (e.g., secure content). In this fashion, the rendering server 116 can process several UI elements included in a particular UI context file to render multiple resultant windows for displaying the different forms of content associated with the application 110. In some embodiments, the rendering server 116 can include the functionality to independently render multiple windows using off-screen buffers or other dedicated video memory.

Accordingly, FIG. 1 sets forth an overview of the different components of the computing device 102 that can be utilized to enable the implementation of the embodiments described herein. As described in greater detail below, these components can be configured to selectively utilize different UI context files to display secure content based on detected computing states, according to some embodiments.

Figure 2:
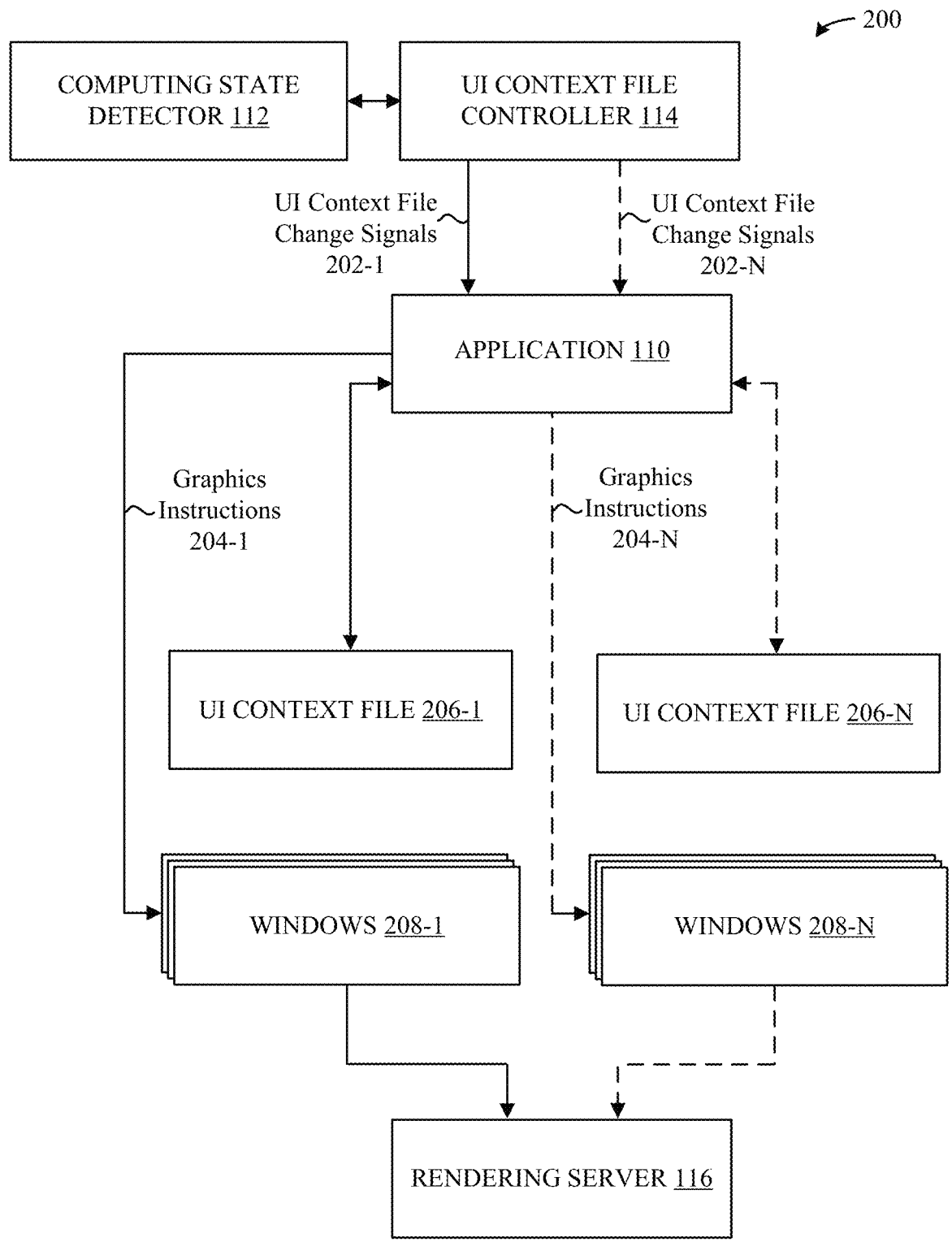
FIG. 2 illustrates a conceptual diagram that utilizes multiple user interface (UI) context files to display content in accordance with changes in the computing states of a computing device, according to some embodiments.

FIG. 2 illustrates a conceptual diagram 200 that involves the application 110 utilizing multiple UI context files to display content in accordance with changes in computing states of the computing device 102, according to some embodiments. For example, the computing state detector 112 can detect a computing state change that indicates that the computing device 102 is currently in an unlocked-mode. In response to this detection, the computing state detector 112 can send signals to the UI context file controller 114 that alert the UI context file controller 114 of the change in computing state. Upon receipt of these signals from the computing state detector 112, the UI context file controller 114 can send control signals—e.g., the UI context file change signals 202-1 illustrated in FIG. 2—that cause the application 110 to switch from a UI context file currently being used by the application 110 (not illustrated in FIG. 2) to UI context file 206-1.

According to some embodiments, the decision to select the UI context file 206-1 can be pre-determined based on computing state conditions and a desired content to be associated with the UI context file 206-1. For example, with respect to decisions concerning computing state conditions, according to one embodiment, the UI context file 206-1 can include metadata that prescribes one or more appropriate conditions when application 110 can select the UI context file 206-1. In this fashion, the application 110 can be configured to read the metadata in advance of the one or more conditions expressed in the metadata such that the application 110 can switch to the UI context file 206-1 when an expressed condition is met.

According to one embodiment, the application 110 can be configured to load metadata concerning all available UI context files, including the UI context file 206-1, during execution of the application 110. Thus, the UI context file 206-1 can include a property that specifically links the UI context file 206-1 to the unlocked-mode and causes it to be instantiated any time the unlocked-mode is triggered. Accordingly, the UI context file 206-1—and the UI elements included therein—can be specifically pre-defined and used by the application 110 in response to a detection of the unlocked-mode at the computing device 102.

The UI elements included in the UI context file 206-1 can include a number of different pre-defined UI elements that are arranged in a particular order for use in drawing each window from the windows 208-1. During the production of the windows 208-1, according to one embodiment, graphics instructions 204-1 can be generated by the application 110 and reference window data from memory resident on the computing device 102 to draw each window. Each window produced from the graphics instructions 204-1 can be communicated to the rendering server 116 for rendering a display on a display device. Accordingly, each window can belong to a set of windows (e.g., windows 208-1) that represent a particular content associated with the application 110 based on its corresponding UI context file (e.g., UI context file 206-1).

With respect to decisions concerning desirable content, content associated with the UI context file 206-1 can be determined during an application development period as more appropriate for display during an unlocked-mode. For instance, the content produced by the windows 208-1, based on configurations expressed in the UI context file 206-1, can be used to generate typical content produced by the application 110 when it is executed during the unlocked-mode. As described herein, typical content can include content that allows the user to fully utilize the functionality offered by the application 110 when the computing device 102 is in an unlocked-mode and/or when a user supplies proper credentials to access the computing device 102. Accordingly, upon an initial execution of the application 110 during the unlocked-mode and/or entry of proper user credentials, the UI context file controller 114 can be configured to send control signals (e.g., UI context file change signals 202-1) that cause the application 110 to utilize the UI context file 206-1 so that content associated with the windows 208-1 is displayed to the user.

According to some embodiments, the application 110 can dynamically select from any number of different UI context files during execution (e.g., UI context files 206-1, 206-N, and so on) based on different computing states detected by the computing state detector 112. Each UI context file can be pre-configured to cause content associated with the application 110 to be displayed to a user in a specific form. In this fashion, the UI context file controller 114, in response to changes detected by the computing state detector 112—can send control signals to the application 110 that cause it to pivot from one UI context file to an appropriate context UI file.

For example, with further reference to FIG. 2, the computing state detector 112 can detect a change in computing state that causes the computing device 102 to enter into a locked-mode. In response to receiving signals indicating this detection from the computing state detector 112, the UI context file controller 114 can correspondingly send control signals—e.g., the UI context file change signals 202-N illustrated in FIG. 2—to the application 110 that cause it to pivot to using the UI context file 206-N. Notably, the decision to select the UI context file 206-N in response to the locked-mode can also be pre-determined and can also include metadata that prescribes one or more appropriate conditions when the application 110 can select the UI context file 206-N. Thus, the UI context file 206-N can include a property that specifically links the UI context file 206-N to the locked-mode and causes it to be instantiated any time the locked-mode is triggered. Accordingly, the UI context file 206-N—and the UI elements included therein—can be specifically pre-defined and used by the application 110 in response to a detection of the locked-mode at the computing device 102.

In a manner similar to the UI context file 206-1, the UI elements included in the UI context file 206-N can also include a number of different pre-defined UI elements that are arranged in a particular order for use in drawing each window from windows 208-N. Accordingly, during the production of the windows 208-N, according to one embodiment, graphics instructions 204-N can be generated by the application 110 and reference window data from memory resident on the computing device 102 to draw each window. Each window produced from the graphics instructions 204-N can be communicated to the rendering server 116 for rendering a display on a display device. Accordingly, each window can belong to a set of windows (e.g., windows 208-N) that represent a particular content associated with the application 110 based on the UI context file 206-N.

The content associated with the UI context file 206-N can also be pre-determined during an application development period as more appropriate for display during the locked-mode. For instance, the content produced by the windows 208-N, based on configurations expressed in the UI context file 206-N, can be used to generate secure content produced by the application 110 when it is executed during the locked-mode. As described herein, secure content can include, for example, content that prevents or omits certain UI elements that include private user information from being displayed when the computing device 102 is in the locked-mode. Accordingly, when the application 110 is executed during the locked-mode, the UI context file controller 114 can be configured to send control signals (e.g., UI context file change signals 202-N) that cause the application 110 to utilize the UI context file 206-N so that the secure content associated with the windows 208-N is displayed to the user.

Furthermore, as described herein, additional UI context files (other than the UI context files 206-1 and 206-N) can be used to display different windows in accordance with a particular content intended to be associated with the application 110 by developers of the application 110. For instance, the additional UI context files can be configured to generate windows in accordance with other auxiliary system events that occur at the computing device, in addition to the locked and unlocked-modes. Auxiliary system events can be any event that the application 110 is pre-configured to detect for purposes of pivoting to a different UI context file, such as gestures (e.g., hand motions performed within a 3D space proximate or at the computing device), a current orientation of computing device (e.g., lifting the computing device from a rest position), detected movements involving the use of a peripheral device coupled to the computing device (e.g., pen swipes), and the like.

In response to detecting these auxiliary system events, the computing state detector 112 can send signals to the UI context file controller 114, which can send correspondingly send control signals to the application 110 to pivot to a UI context file associated with the auxiliary system event. Accordingly, the UI context file can be used to produce windows and render content deemed appropriate based on the detected auxiliary system event. For instance, a detected auxiliary system event can be "swipe left" finger gesture performed at the computing device 102 which results in the application 110 generating graphics-rendering instructions for a particular set of windows that correspond to the "swipe left" finger gesture.

A detected auxiliary system event can also be a "swipe right" finger gesture performed at the computing device 102 which results in the application 110 generating graphics-rendering instructions for a different set of windows that correspond to the "swipe right" finger gesture. In this manner, several different sets of windows can be associated with different auxiliary system events. Furthermore, according to some embodiments, multiple UI display views can be configured based on a particular UI context file. In this manner, embodiments support the use of multiple UI displays of an application to be mapped to different displays or multiple views to a same display.

Figure 3A:
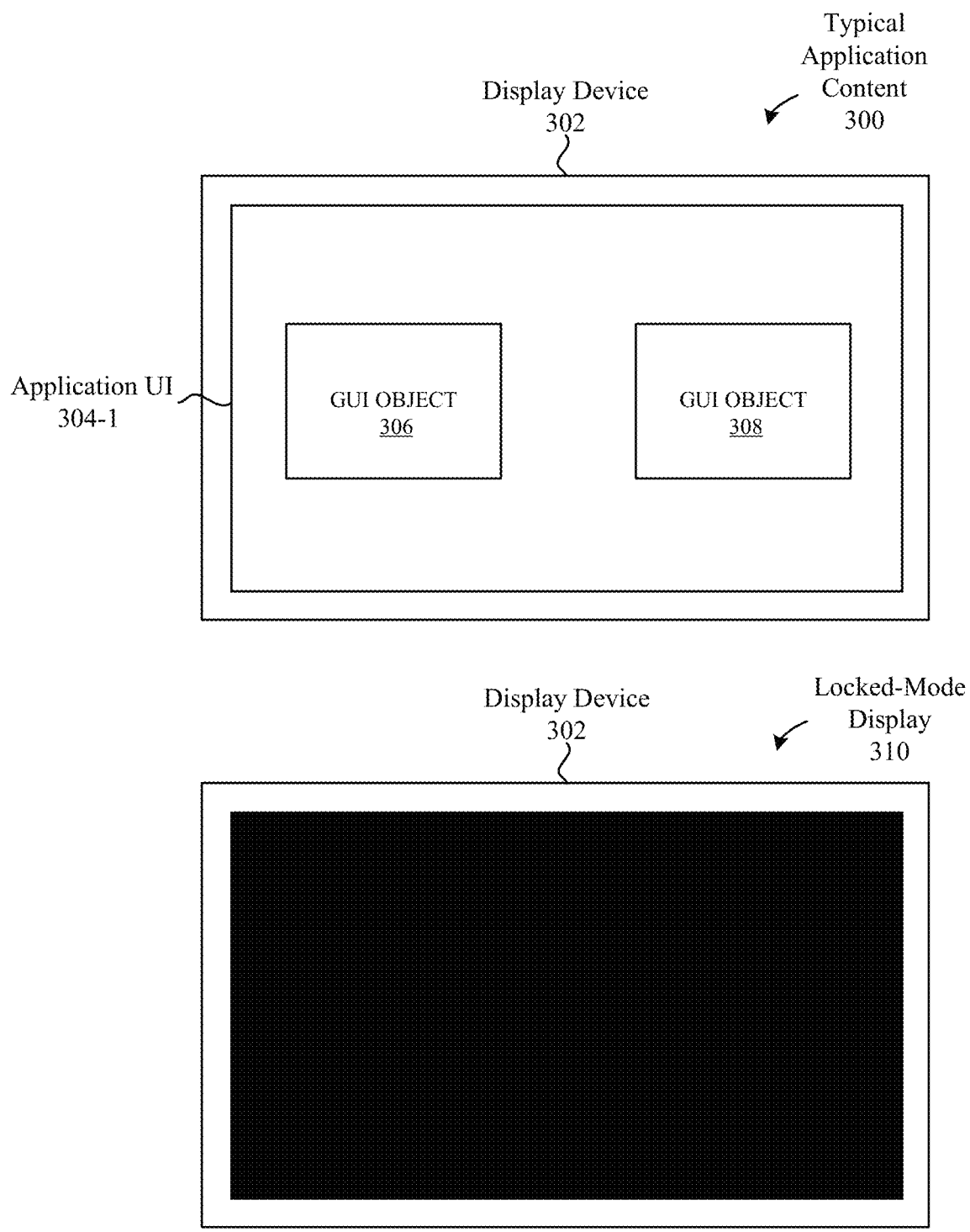
FIGS. 3A-3B depict a computing device pivoting between displaying different forms of content associated with an application, according to some embodiments.
Figure 3B:
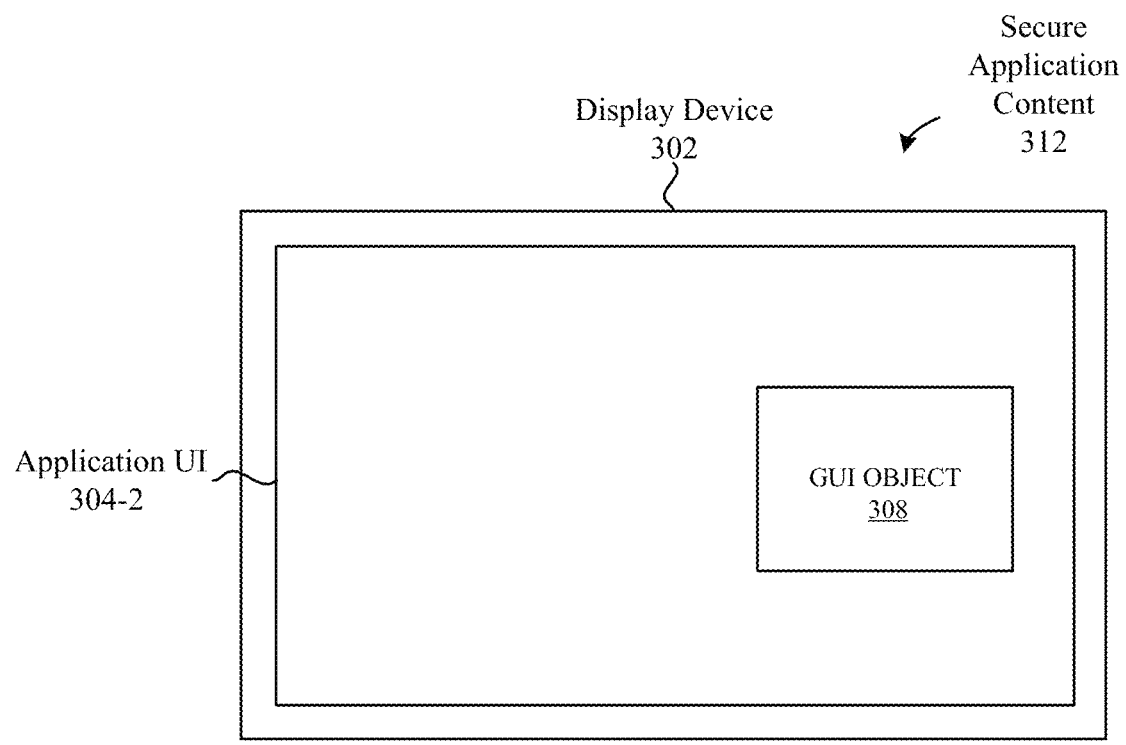

FIGS. 3A-3B depict the computing device 102 pivoting between displaying different forms of content associated with the application 110, according to some embodiments. With reference to FIG. 3A, typical application content 300 depicts current content (e.g., application UI 304-1) produced by the application 110 that is presented at a display device using the rendering procedures performed by the rendering server 116 described herein. The typical application content 300 can be based on a given UI context file, e.g., the UI context file 206-1 described above in conjunction with FIG. 2. In accordance with FIG. 3A, the configurations expressed in the UI context file 206-1 (not depicted in FIG. 3A) can enable the application 110 to display private user information via a display device 302. In this fashion, the UI context file 206-1 can include UI elements that are configured to display private user information in a manner that is readily apparent to a user. In this example, the typical application content 300 can be displayed when the application 110 utilizes the UI context file 206-1 in response to detecting that the computing device 102 enters into an unlocked-mode.

As illustrated in FIG. 3A, the application UI 304-1 includes two graphical user interface ("GUI") objects 306 and 308. The GUI objects 306 and 308 can be pre-defined UI elements arranged in a particular order based on a configuration expressed in the UI context file 206-1. In accordance with the UI context file 206-1, the application 110 generates graphics-rendering instructions that are communicated to the rendering server 116 so that the GUI objects 306 and 308 are presented in a pre-determined arrangement in the application UI 304-1 for display on the display device 302.

With further reference to FIG. 3A, during execution of the application 110, the computing device 102 can enter into a locked-mode. For example, the computing device 102 can enter the locked-mode upon detecting a lack of user activity, a user-initiated action (e.g., a press of a power button on the computing device 102), and so on. When the computing device 102 enters the locked-mode, the display device 302 can either be in a powered-on state (with content displayed) or a powered-off state (with no content displayed). For example, the locked-mode display 310 illustrates when the computing device 102 is in a locked state and the display device 302 is powered-off, i.e., no content associated with the application 110 is displayed.

With reference now to FIG. 3B, the display device 302 can return to a powered-on state (e.g., an awake state) that involves the computing device 102 remaining in the locked-mode. In response to a detection of the locked-mode (with the display device 302 powered-on), the computing state detector 112 can issue signals to the UI context file controller 114 indicating the change in the computing state. In response, the UI context file controller 114 can send control signals that cause the application 110 to disregard the UI context file 206-1, and instead utilize, for example, the UI context file 206-N described above in conjunction with FIG. 2.

In accordance with FIG. 3B, the configurations expressed in the UI context file 206-N (not depicted in FIG. 3B) can enable the application 110 to advantageously prevent private user information from being displayed on the display device 302. In this fashion, the UI context file 206-N can hide/omit UI elements that are configured to display private user information in a manner that is not viewable to the user. In this fashion, the application 110 can transition from displaying content associated with the typical application content 300 in FIG. 3A to displaying the content depicted in the secure application content 312 in FIG. 3B. As shown in FIG. 3B, the secure application content 312 depicts a different UI display—illustrated in FIG. 3B as application UI 304-2—produced by the application 110 that is presented at the display device 302.

As illustrated in FIG. 3B, the application UI 304-2 includes only the GUI object 308, instead of both the GUI objects 306 and 308 as depicted in FIG. 3A. In this manner, the GUI object 306 is omitted from the application UI 304-2 in accordance with configurations expressed in the UI context file 206-N for security purposes. For example, the GUI object 306 may indicate personal/private information, such as user identification data (e.g., social security numbers, driver's license information), financial data (e.g., credit card or bank information), private user photos or videos, private contact lists, personal user notes, and so on. Accordingly, GUI object 306 can be displayed to a user as an object displayed in typical application content 300 during an unlocked-mode (e.g., after a user has been properly authenticated). Alternatively, while the computing device 102 is in a locked-mode, the GUI object 306 can be hidden or removed when secure application content 312 is displayed for security purposes.

Furthermore, in response to receiving signals from the computing state detector 112 associated with detecting a supplemental lock event on the computing device 102 (e.g., the computing device 102 returning to an unlocked-mode), the UI context file controller 114 can send control signals that cause the application 110 to pivot from using the UI context file 206-N to using the UI context file 206-1. In this fashion, the application 110 can switch back to displaying the typical application content 300, as described in FIG. 3A. It is noted that FIGS. 3A-3B involve computing device 102 transitioning between two different UI context files. However, as described herein, any number of context files-corresponding to any number of computing states-can be utilized to enable different content to be displayed at appropriate times. In this fashion, computing state detector 112 and UI context file controller 114 can cause application 110 to toggle between several different UI context files which in turn display several different content types to a user during an application session.

Additionally, it is noted that the difference in content between typical application content and secure application content may be subtle to avoid minimizing a user's overall enjoyment and experience with application 110, while achieving enhanced security, which is described below in greater detail in conjunction with FIGS. 4A-4C. In this manner, the differences between typical application content and secure application content may not be perceivable to a user, thereby improving the overall user experience.

Figure 4A:
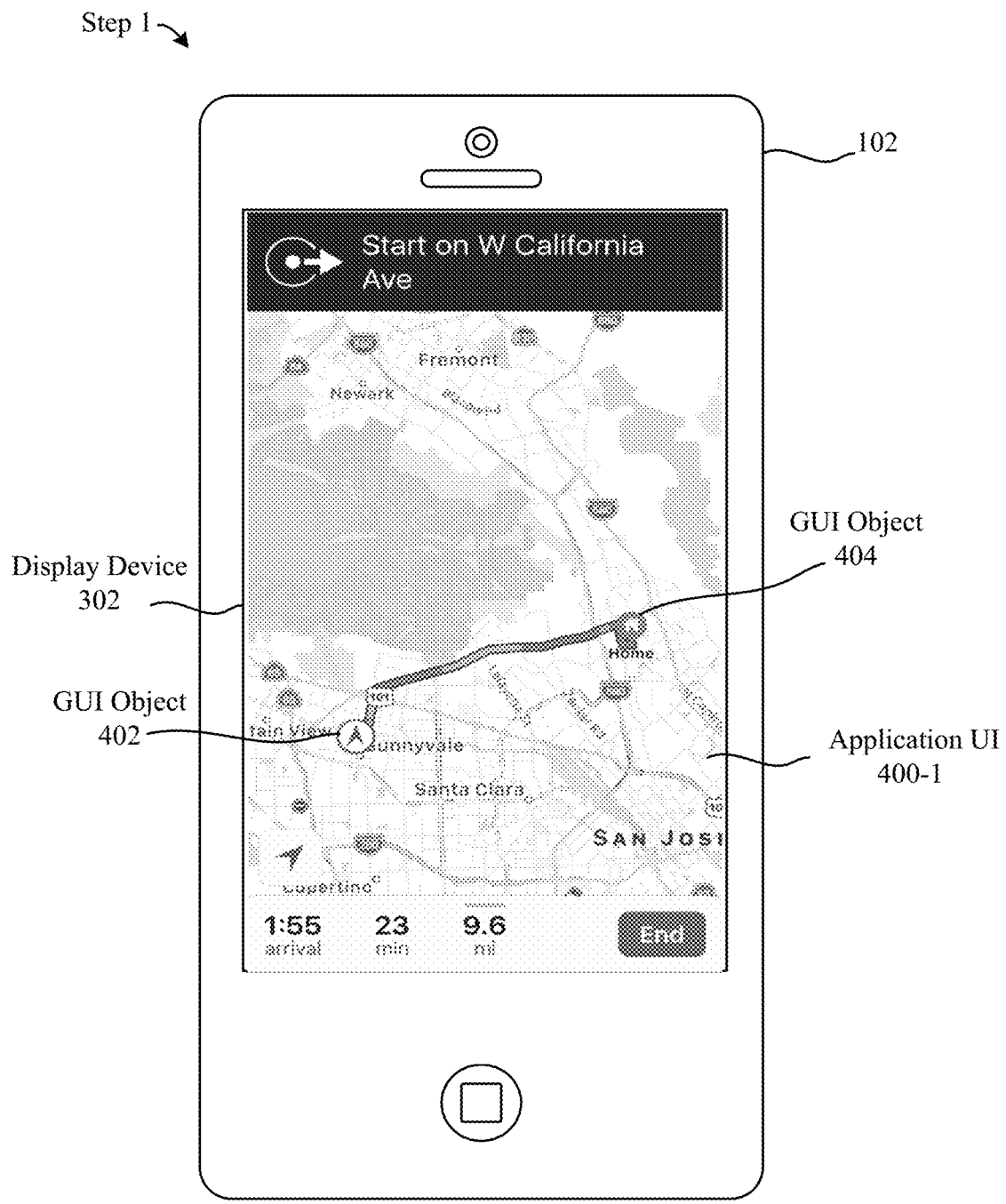
FIGS. 4A-4C illustrate an example use-case scenario that depicts computing device pivoting between displaying different forms of application content, according to some embodiments.
Figure 4B:
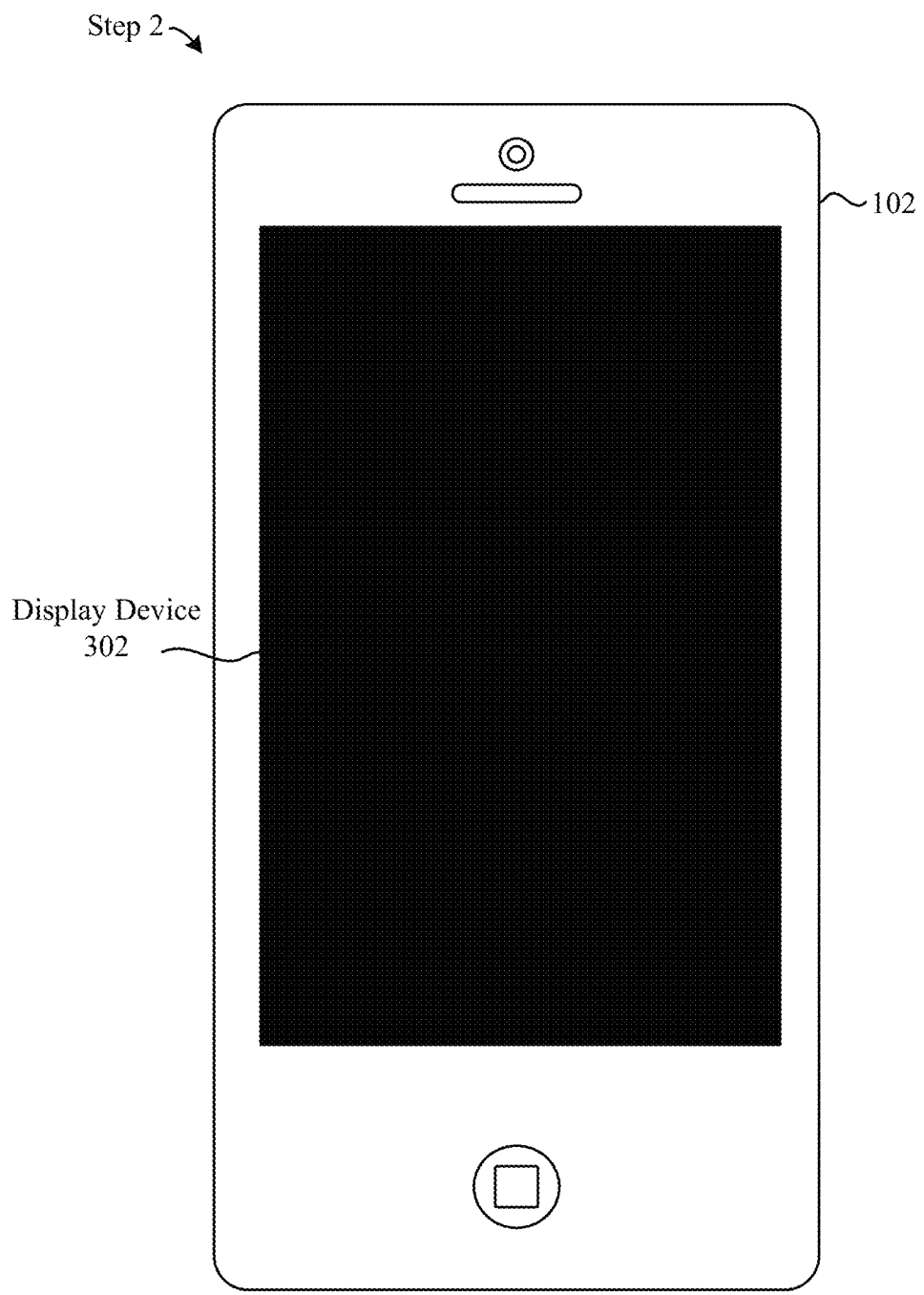
Figure 4C:
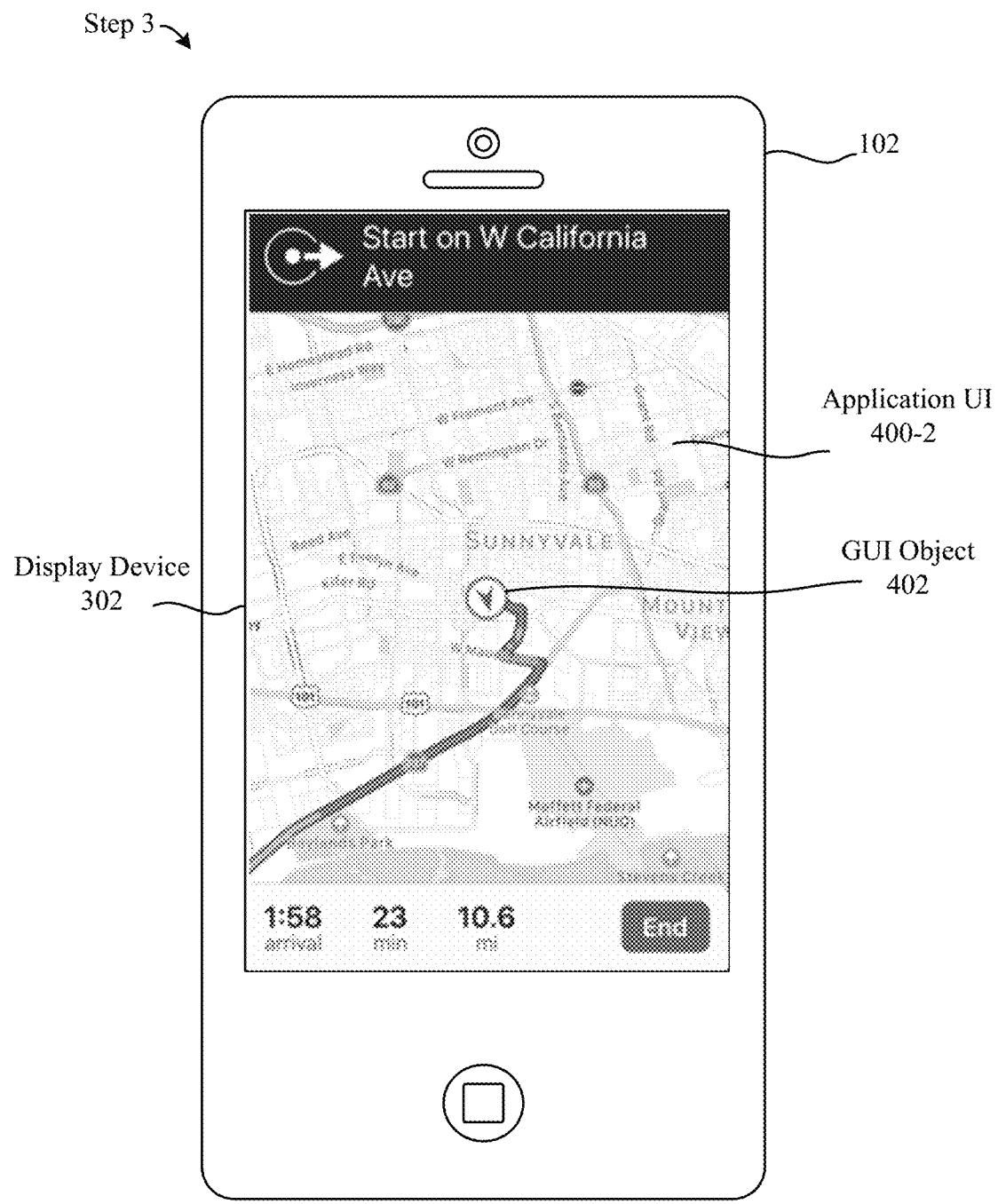

FIGS. 4A-4C illustrate an example use-case scenario that depicts the computing device 102 pivoting between displaying different forms of application content, according to some embodiments. As depicted in step 1 of FIG. 4A, the computing device 102 can execute a digital mapping application that provides real-time navigational directions to a user. Using the display device 302, the mapping application can produce a set of windows for displaying typical content to the user (e.g., application UI 400-1) based on configurations expressed in a UI context file, e.g., the UI context file 206-1 described above in conjunction with FIG. 2. Thus, the application UI 400-1 is generally displayed during an unlocked-mode on the computing device 102.

In the example illustrated in FIG. 4A, the application UI 400-1 can display a route that includes a GUI object 402 that represents a current location of the computing device 102, as well as a GUI object 404 that represents a desired endpoint location that also happens to be the user's home. Given that the computing device 102 is in an unlocked-mode, the UI context file 206-1 allows the mapping application to display UI elements that are considered private information, such as showing the user's home address/location. However, as described in greater detail herein, this private information can be omitted when the computing device 102 enters into a locked-mode.

With reference now to step 2 of FIG. 4B, during execution of the mapping application, the display device 302 of the computing device 102 can enter into a powered-off state, e.g., in response to a user pressing a power button on the computing device 102. As previously described above, this can also involve the computing device 102 entering into a locked-mode. With reference now to step 3 of FIG. 4C, the display device 302 of the computing device 102 can return to a powered-on state, where the computing device 102 remains in the locked-mode. In response accordance with the locked-mode, the computing state detector 112 can send control signals that cause the mapping application to pivot from using the UI context file 206-1 towards the use of more secure content configurations expressed in a different UI context file, e.g., the UI context file 206-N described above in conjunction with FIG. 2.

In this fashion, the mapping application can switch from displaying typical application content to more-secure application content. For example, as illustrated in step 3 in FIG. 4C, the mapping application displays the GUI object 402, but omits the GUI object 404 that included information about the user's home as previously depicted in the currently displayed application UI 400-1 in FIG. 4A.

Accordingly, to provide a more secure user experience, the mapping application can be configured to pivot to the UI context file 206-N from the UI context file 206-1, and remain utilizing the UI context file 206-N for the duration of the locked-mode in a manner that still allows the user to enjoy the general features of the mapping application while omitting potentially sensitive information. It is noted that the user interfaces illustrated in the FIGS. and described herein are merely exemplary, and that the UI context files can be utilized to implement any form of user interface appropriate for the different operating modes of the computing device 102. For example, the UI context file 206-N can include configurations that restrict the ability to use standard functional controls typically allowed by an application during an unlocked-mode, e.g., looking up recently-visited addresses, recent address searches, user information, and so on.

Accordingly, the embodiments described in FIGS. 3A-3B and 4A-4C illustrate how different windows of an application can be established in a manner that prevents UI elements from having to be dynamically adjusted within the windows (e.g., added to, removed from, moved within, etc.) at runtime. By pivoting between multiple UI context files in the manner described herein, there can be a reduction in the overall likelihood of accidentally displaying UI elements that reveal private information or potentially can provide access to private information. Furthermore, as illustrated by the embodiments described herein, determinations concerning when an application pivots from one UI context file to another UI context file can be made at a system-level thereby allowing the application to execute more freely without the need to constantly focus on the current computing state of computing device 102.

Figure 5:
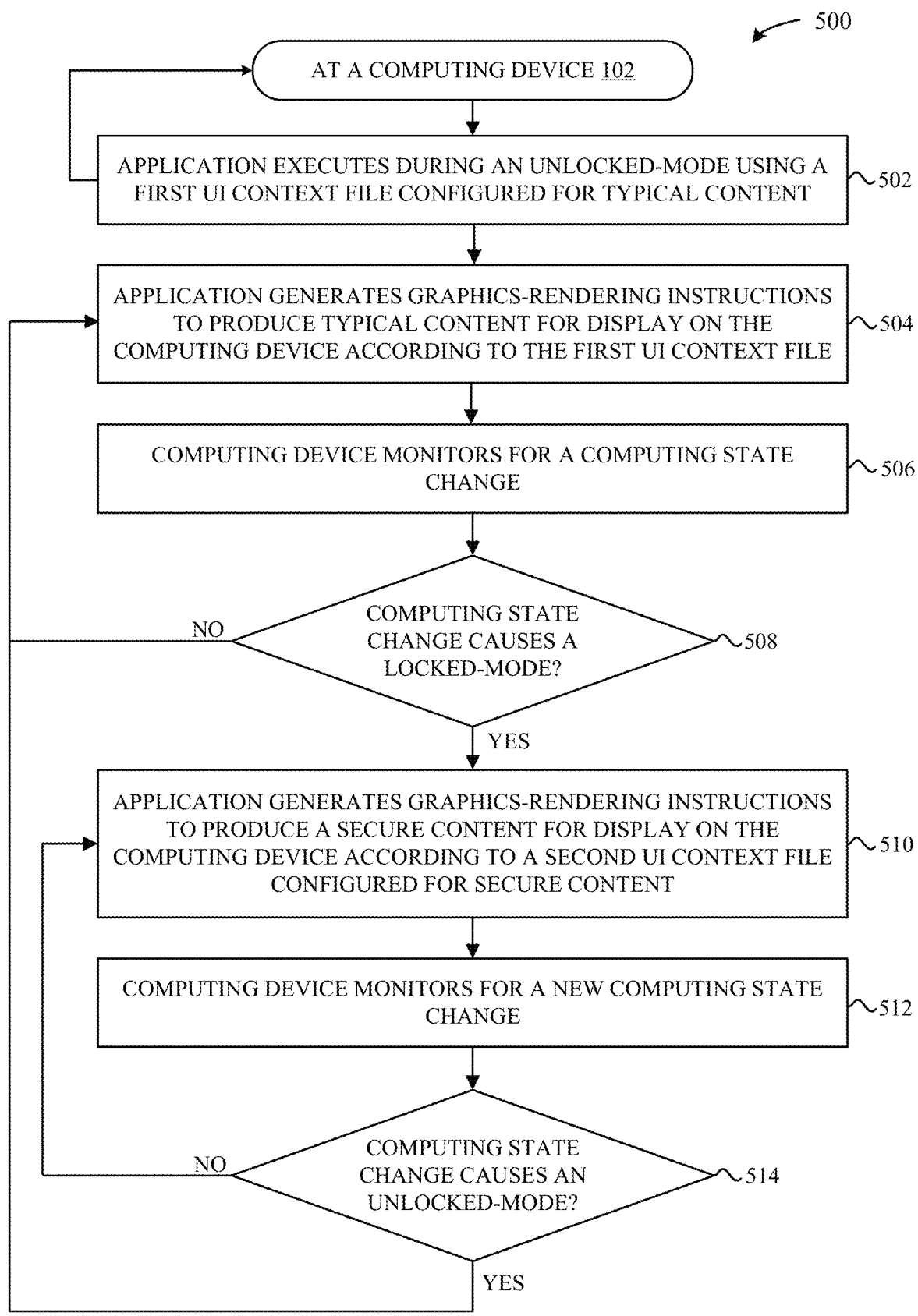
FIG. 5 illustrates a method for displaying secure content for an application through (UI) context file switching, according to some embodiments.

FIG. 5 illustrates a method 500 for displaying secure forms of content through UI context file switching, according to some embodiments. As shown in FIG. 5, the method 500 can be implemented by computing device 102, and begins at step 502, where computing device 102 executes an application. The application is executed during an unlocked-mode and uses configurations expressed in a first UI context file to present typical content. Next, at step 504, the application generates graphics-rendering instructions to produce typical content for display on the computing device 102 according to the first UI context file. Next, at step 506, computing device 102 performs monitoring procedures to detect a computing state change. A computing state change can be any system event that causes computing device 102 to enter into a locked-mode, such as computing device 102 waking up from a powered-off state.

Next, at step 508, a computing state change is detected which results in computing device 102 determining whether the computing state change caused a locked-mode to occur on computing device 102. If computing device 102 determines that a locked-mode occurred, then the application proceeds to generate graphics-rendering instructions to produce secure content for display on computing device 102 according to a second UI context file, as detailed in step 510. Otherwise, the application continues to generate graphics-rendering instructions to produce the typical content for display on computing device 102 according to the first UI context file, as previously detailed at step 504.

Next, at step 510, computing device 102 determined that a locked-mode did occur and, therefore, the application immediately pivots to generate graphics-rendering instructions to produce secure content for display on computing device 102 according to a second UI context file configured for secure content. The UI elements expressed in the second UI context file are specifically configured for the secure display of content associated with the application.

Next, at step 512, computing device 102 performs monitoring procedures to detect a new computing state change. A new computing state change can be any system event that causes computing device 102 to enter into an unlocked-mode, such as a user supplying valid credentials (e.g., entering a valid password code) to access computing device 102 and view the typical content of the application. Next, at step 514, a new computing state change is detected which results in computing device 102 determining whether the computing state change caused an unlocked-mode to occur on computing device 102. If computing device 102 determines that an unlocked-mode occurred, then the application proceeds to generate graphics-rendering instructions to produce the typical content for display on computing device 102 according to the first UI context file, as previously detailed at step 504. Otherwise, the application continues to generate graphics-rendering instructions to produce secure content for display on computing device 102 according to a second UI context file configured for secure content, as previously detailed at step 510.

Figure 6:
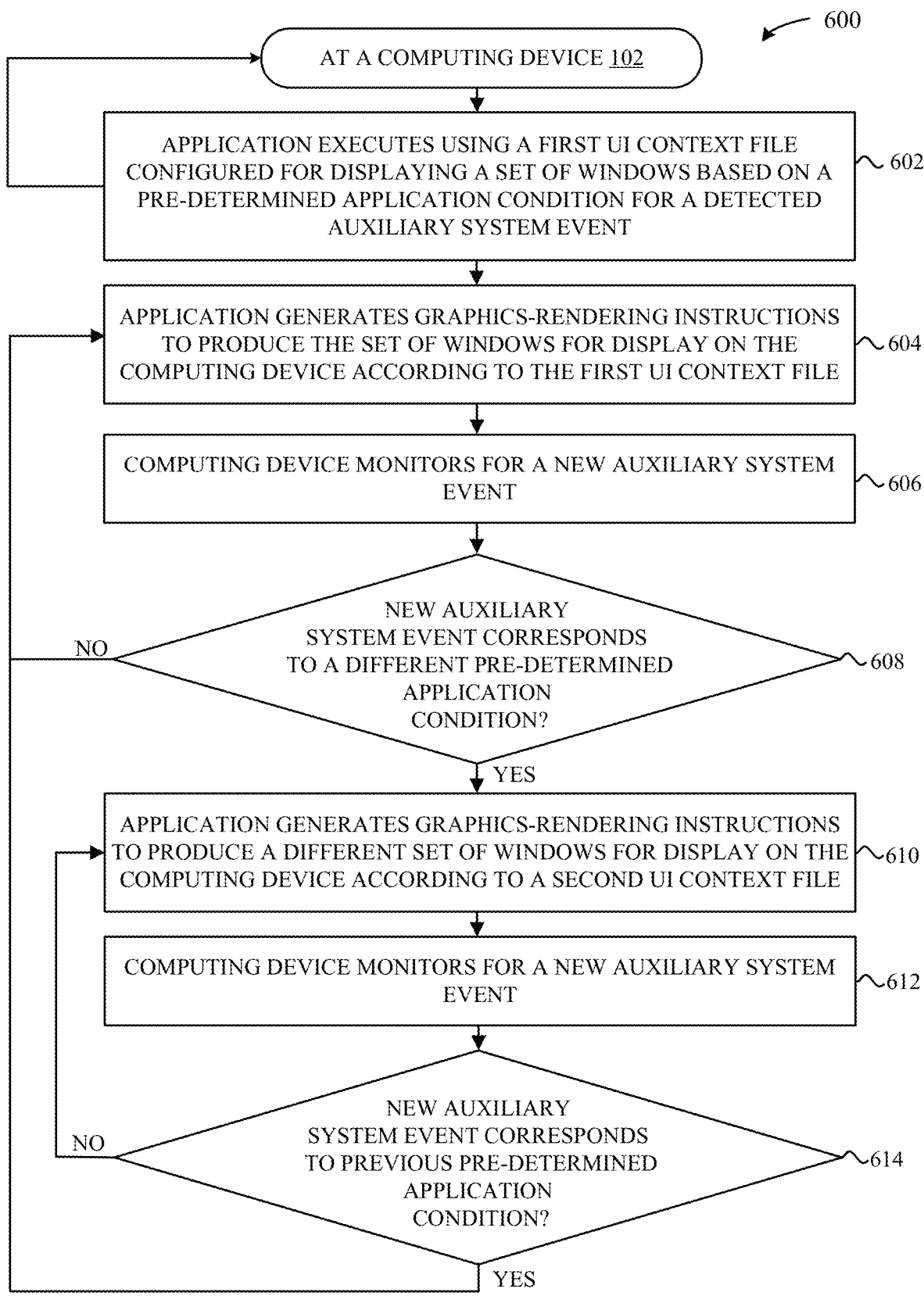
FIG. 6 illustrates a method for displaying different forms of content based on detected auxiliary system events through (UI) context file switching, according to one embodiment.

FIG. 6 illustrates a method 600 for displaying different forms of content based on detected auxiliary system events through UI context file switching, according to some embodiments. As shown in FIG. 6, the method 600 can be implemented by computing device 102, and begins at step 602, where computing device 102 executes an application. The application is executed using a configuration expressed in a first UI context file based on a detected auxiliary system event. The UI elements expressed in the first UI context file are pre-configured to cause a specific set of windows associated with the application to be displayed on a display device coupled to computing device 102. The detected auxiliary system event can include, for example, a gesture, a current orientation of computing device 102, a detected movement involving the use of a peripheral device coupled to computing device 102, and the like.

Furthermore, the use of a specific UI context file whenever a specific auxiliary system event is detected can be prescribed by a pre-determined application condition. A pre-determined application condition includes a condition that causes the application to use a specific UI context file whenever a corresponding auxiliary event is detected. Thus, computing device 102 can be configured to use the first UI context file whenever the auxiliary system event detected at step 602 occurs in accordance with a pre-determined application condition. Next, at step 604, the application generates graphics-rendering instructions to produce the set of windows for display on computing device 102 according to the first UI context file. Next, at step 606, computing device 102 performs monitoring procedures to detect a new auxiliary system event.

Next, at step 608, a new auxiliary system event is detected which results in computing device 102 determining whether the new auxiliary system event corresponds to a different pre-determined application condition. If computing device 102 determines that the detected auxiliary system event corresponds to a different pre-determined application condition, then the application proceeds, in accordance with the different pre-determined application condition, to generate graphics-rendering instructions to produce a different set of windows for display on computing device 102 according to a second UI context file, as detailed in step 610. Otherwise, the application continues to generate graphics-rendering instructions to produce the set of windows for display on computing device 102 according to the first UI context file, as previously detailed at step 604.

Next, at step 610, computing device 102 determined that the detected auxiliary system event corresponds to a different pre-determined application condition and, therefore, the application immediately pivots to a second UI context file which causes the application to generate graphics-rendering instructions to produce a different set of windows for display on computing device 102 according to the second UI context file. The UI elements expressed in the second UI context file are specifically configured for the different set of windows associated with the application. Next, at step 612, computing device 102 performs monitoring procedures to detect a new auxiliary system event.

Next, at step 614, a new auxiliary system event is detected which results in computing device 102 determining whether the new auxiliary system event corresponds to the previous pre-determined application condition, determined at step 602. If computing device 102 determines that the newly detected auxiliary system event corresponds to the previous pre-determined application condition, then the application proceeds to generate graphics-rendering instructions to produce the set of windows for display on computing device 102 according to the first UI context file, as previously detailed at step 604. Otherwise, the application continues to generate graphics-rendering instructions to produce the different set of windows for display on computing device 102 according to the second UI context file, as previously detailed at step 610.

FIG. 7 illustrates a detailed view of a computing device 700 that can be used to implement the various components described herein, according to some embodiments. In particular, the detailed view illustrates various components that can be included in the computing device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

According to some embodiments, the storage device 740 can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for displaying content on a computing device, the method comprising, at the computing device:
executing an application, wherein the application is associated with a plurality of context files;
detecting a lock event on the computing device;
responsive to the lock event, causing the application to:
(1) select a first context file from the plurality of context files, wherein the first context file corresponds to the lock event, and
(2) render a first content of the application for display on the computing device based on the first context file;
detecting an unlock event on the computing device; and
responsive to the unlock event, causing the application to:
(1) select a second context file from the plurality of context files, wherein the second context file corresponds to the unlock event, and
(2) render a typical second content of the application for display on the computing device based on the second context file, wherein the second content is distinct from the first content.

2. The method of claim 1, wherein the lock event is detected during an unlocked-mode on the computing device.

3. The method of claim 1, wherein the first context file includes a first set of graphics-rendering instructions to produce the first content.

4. The method of claim 3, wherein the second context file includes a second set of graphics-rendering instructions to produce the second content, and the second set of graphics-rendering instructions is distinct from the first set of graphics-rendering instructions.

5. The method of claim 1, further comprising:
detecting a supplemental lock event on the computing device; and
causing the application to:
(1) select the first context file from the plurality of context files, and
(2) render the first content of the application for display on the computing device based on the first context file.

6. The method of claim 1, wherein the plurality of context files comprises a third context file from in addition to the first and second context files, and the third context file includes a third set of graphics-rendering instructions to render a third content in accordance with an auxiliary system event that is detected at the computing device.

7. The method of claim 6, further comprising:
detecting the auxiliary system event on the computing device; and
responsive to the auxiliary system event, causing the application to:
(1) select the third context file from the plurality of context files, wherein the third context file corresponds to the auxiliary system event, and
(2) render the third content that corresponds to the auxiliary system event for display on the computing device based on the third context file.

8. A computing device configured to display content, the computing device comprising:
at least one processor; and
at least one memory configured to store instructions that, when executed by the at least one processor, cause the computing device to carry out steps that include:
executing an application, wherein the application is associated with a plurality of context files;
detecting a lock event on the computing device;
responsive to the lock event, causing the application to:
(1) select a first context file from the plurality of context files, wherein the first context file corresponds to the lock event, and
(2) render a first content of the application for display on the computing device based on the first context file;
detecting an unlock event on the computing device; and
responsive to the unlock event, causing the application to:
(1) select a second context file from the plurality of context files, wherein the second context file corresponds to the unlock event, and
(2) render a second content of the application for display on the computing device based on the second context file, wherein the second content is distinct from the first content.

9. The computing device as described in claim 8, wherein the lock event is detected during an unlocked-mode on the computing device.

10. The computing device as described in claim 8, wherein the first context file includes a first set of graphics-rendering instructions to produce the first content.

11. The computing device as described in claim 10, wherein the second context file includes a second set of graphics-rendering instructions to produce the second content, and the second set of graphics-rendering instructions is distinct from the first set of graphics-rendering instructions.

12. The computing device as described in claim 8, wherein the steps further include:
detecting a supplemental lock event on the computing device; and
causing the application to:
(1) select the first context file from the plurality of context files, and
(2) render the first content of the application for display on the computing device based on the first context file.

13. The computing device as described in claim 8, wherein the plurality of context files comprises a third context file in addition to the first and second context files, and the third context file includes a third set of graphics-rendering instructions to render a different content in accordance with an auxiliary system event that is detected at the computing device.

14. The computing device as described in claim 13, wherein the steps further include:
detecting the auxiliary system event on the computing device; and
responsive to the auxiliary system event, causing the application to:
(1) select the third context file from the plurality of context files, wherein the third context file corresponds to the auxiliary system event, and
(2) render the different content that corresponds to the auxiliary system event for display on the computing device based on the third context file.

15. At least one non-transitory computer readable storage medium configured to store instructions that, when executed by at least one processor included in a computing device, cause the computing device to display content, by carrying out steps that include:

executing an application, wherein the application is associated with a plurality of context files;

detecting a lock event on the computing device;

responsive to the lock event, causing the application to:
        (1) select a first context file from the plurality of context files, wherein the first context file corresponds to the lock event, and
        (2) render a first content of the application for display on the computing device based on the first context file;

detecting an unlock event on the computing device; and responsive to the unlock event, causing the application to:
        (1) select a second context file from the plurality of context files, wherein the second context file corresponds to the unlock event, and
        (2) render a second content of the application for display on the computing device based on the second context file, wherein the second content is distinct from the first content.

16. The at least one non-transitory computer readable storage medium as described in claim 15, wherein the lock event is detected during an unlocked-mode on the computing device.

17. The at least one non-transitory computer readable storage medium as described in claim 15, wherein the first context file includes a first set of graphics-rendering instructions to produce the first content.

18. The at least one non-transitory computer readable storage medium as described in claim 17, wherein the second context file includes a second set of graphics-rendering instructions to produce the second content, and the second set of graphics-rendering instructions is distinct from the first set of graphics-rendering instructions.

19. The at least one non-transitory computer readable storage medium as described in claim 15, wherein the steps further include:

detecting a supplemental lock event on the computing device; and causing the application to:
        (1) select the first context file from the plurality of context files, and
        (2) render the first content of the application for display on the computing device based on the first context file.

20. The at least one non-transitory computer readable storage medium as described in claim 15, wherein the plurality of context files comprises a third context file in addition to the first and second context files, and the third context file includes a third set of graphics-rendering instructions to render a different content in accordance with an auxiliary system event that is detected at the computing device.

* * * * *

UNITED STATES PATENT AND TRADEMARK OFFICE
CERTIFICATE OF CORRECTION

Page 1 of 1

PATENT NO. : 10,902,101 B2
APPLICATION NO. : 15/980698
DATED : January 26, 2021
INVENTOR(S) : Chinn et al.

It is certified that error appears in the above-identified patent and that said Letters Patent is hereby corrected as shown below:

In the Claims

Claim 1, Column 15, Line 18: "render a typical second content" should read -- render a second content --.

Claim 6, Column 15, Line 2: "third context file from in addition to" should read -- third context file in addition to --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*